(12) United States Patent
Seifert

(10) Patent No.: US 12,269,346 B2
(45) Date of Patent: Apr. 8, 2025

(54) REDUCED OPERATOR CONTROL DEVICE

(71) Applicant: VOLKSWAGEN AKTIENGESELLSCHAFT, Wolfsburg (DE)

(72) Inventor: Jörg Seifert, Halle (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 0 days.

(21) Appl. No.: 18/682,460

(22) PCT Filed: Jul. 13, 2022

(86) PCT No.: PCT/EP2022/069676
§ 371 (c)(1),
(2) Date: Feb. 9, 2024

(87) PCT Pub. No.: WO2023/016740
PCT Pub. Date: Feb. 16, 2023

(65) Prior Publication Data
US 2024/0351436 A1 Oct. 24, 2024

(30) Foreign Application Priority Data
Aug. 10, 2021 (DE) ............ 10 2021 208 728.0

(51) Int. Cl.
*B60K 35/10* (2024.01)
*B60K 35/23* (2024.01)
(Continued)

(52) U.S. Cl.
CPC .............. *B60K 35/10* (2024.01); *B60K 35/23* (2024.01); *B62D 1/046* (2013.01); *G06F 3/02* (2013.01);
(Continued)

(58) Field of Classification Search
CPC .. B60K 35/10; B60K 35/23; B60K 2360/126; B60K 2360/128; B60K 2360/1446;
(Continued)

(56) References Cited

U.S. PATENT DOCUMENTS 8,843,268 B2 9/2014 Lathrop
10,318,118 B2 6/2019 Hanaoka et al.
(Continued)

FOREIGN PATENT DOCUMENTS

DE 19604351 A1 8/1997
DE 202006017330 U1 1/2007
(Continued)

OTHER PUBLICATIONS

Search Report; International Patent Application No. PCT/EP2022/069676; Oct. 27, 2022.

*Primary Examiner* — Dmitriy Bolotin
(74) *Attorney, Agent, or Firm* — Barnes & Thornburg LLP

(57) ABSTRACT

An operator control device for controlling vehicle functions in a transportation vehicle, a system, and a corresponding method. Provided are operator control elements on a steering wheel and a display indicator to be used for controlling vehicle functions. Operator control zones/regions with which functions are selected and controlled are located on the left and the right of the steering wheel in a position that is ergonomically easily reached by the driver's thumbs. The contexts/functions to be controlled in each case are depicted in the display element in the driver's line of sight here, so that diversion of the driver's eyes is minimized. The operator control elements are of a symmetrical design.

15 Claims, 7 Drawing Sheets

(51) Int. Cl.
*B62D 1/04* (2006.01)
*G06F 3/02* (2006.01)

(52) U.S. Cl.
CPC .. *B60K 2360/126* (2024.01); *B60K 2360/128* (2024.01); *B60K 2360/1446* (2024.01); *B60K 2360/164* (2024.01); *B60K 2360/191* (2024.01)

(58) Field of Classification Search
CPC ........ B60K 2360/164; B60K 2360/191; B60K 2360/782; B60K 35/25; B60K 35/60; B60K 35/81; B60K 2360/11; B60K 2360/111; B60K 2360/115; B62D 1/046; G06F 3/02; G06F 2203/0339; G06F 1/1639; G06F 3/04842; G06F 3/0488; G06F 3/0482
See application file for complete search history.

(56) References Cited

U.S. PATENT DOCUMENTS

| | | | | |
|---|---|---|---|---|
| 2013/0076499 A1* | 3/2013 | Okita | ...................... | H04N 5/77 340/438 |
| 2014/0168130 A1* | 6/2014 | Hirai | ......................... | G06F 3/02 345/173 |
| 2015/0022465 A1 | 1/2015 | Yamada | | |
| 2015/0344059 A1* | 12/2015 | Kim | ........................ | B60K 35/00 345/184 |
| 2016/0297462 A1* | 10/2016 | Sonoda | ................... | B60K 35/10 |
| 2017/0038775 A1* | 2/2017 | Park | ....................... | B60W 10/22 |
| 2018/0022217 A1* | 1/2018 | Staude | ................... | B60K 35/00 715/863 |
| 2018/0307405 A1* | 10/2018 | Dandekar | ........... | G06F 3/04883 |
| 2019/0009676 A1* | 1/2019 | Yokota | ................. | G06F 3/0484 |
| 2020/0064949 A1* | 2/2020 | Maier | ..................... | G06F 3/044 |
| 2024/0265922 A1* | 8/2024 | Clay | ....................... | G06F 3/165 |
| 2024/0351436 A1* | 10/2024 | Seifert | ................. | G06F 1/1639 |

FOREIGN PATENT DOCUMENTS

| | | |
|---|---|---|
| DE | 102010005483 A1 | 8/2010 |
| DE | 102010055132 A1 | 6/2012 |
| DE | 102012010125 A1 | 12/2012 |
| DE | 102014213429 A1 | 1/2015 |
| DE | 102014118957 A1 | 6/2016 |
| DE | 202015003050 U1 | 8/2016 |
| DE | 102015010376 A1 | 2/2017 |
| DE | 102017106578 A1 | 10/2017 |
| DE | 102017106212 A1 | 9/2018 |
| DE | 102017212447 A1 | 1/2019 |
| EP | 1247686 A2 | 10/2002 |
| EP | 1502835 A1 | 2/2005 |

* cited by examiner

REDUCED OPERATOR CONTROL DEVICE

PRIORITY CLAIM

This patent application is a U.S. National Phase of International Patent Application No. PCT/EP2022/069676, filed 13 Jul. 2022, which claims priority to German Patent Application No. 10 2021 208 728.0, filed 10 Aug. 2021, the disclosures of which are incorporated herein by reference in their entireties.

SUMMARY

Illustrative embodiments relate to an operator control device for operating a plurality of vehicle functions in a transportation vehicle, a system and a corresponding method.

BRIEF DESCRIPTION OF THE DRAWINGS

Disclosed embodiments are explained below with reference to the drawings, in which.

DETAILED DESCRIPTION

Figure 1:
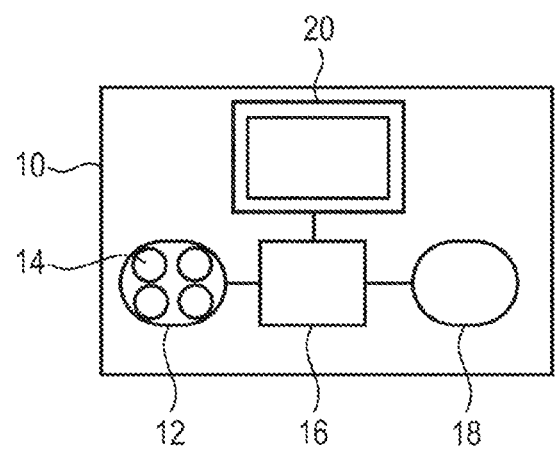
FIG. 1 shows a schematic illustration of an operator control device.

Modern transportation vehicles have a large number of technical devices. In particular, an infotainment system, an air conditioning system, a navigation system or driver assistance systems, such as a cruise control system, may be installed. This large number of devices leads to partially overloaded and incomprehensible operator control regions. The limited installation space available for ergonomically easily accessible operator control regions leads to a dense and stacked arrangement of the operator control elements. As a result of the small amount of space for unique identification, small, barely detectable pushbutton labeling is carried out. The operation of the technical devices is complicated, prone to faults and poses a high distraction potential for a driver. In addition, the large number of operator control elements leads to low operating convenience.

It is known to reduce the number of operator control elements by transferring the operating function into an HMI (human machine interface). Furthermore, physical grouping of functions, for example, by arranging them in a plurality of steering wheel spokes, can be carried out. In addition, it is known to transfer functions, for example, to additional steering column levers.

Published application DE 20 2015 003 050 U1 relates to a vehicle having a head-up display for projecting a display image into the visual field of a driver, a controller for optionally providing a standard image and at least one alternative image as the display image to be projected, wherein the controller is connected to at least one manually actuated operator control element, to provide the alternative image as long as the operator control element is actuated. The drawback here is that only switching between a display image and an alternative image is possible by the operator control element. As a result, no vehicle function can be controlled, instead only a changeover between different contents to be displayed can be made.

Published application DE 20 2006 017 330 U1 relates to a steering wheel switch module for a transportation vehicle for integration into a spoked steering wheel of the transportation vehicle, having at least two multi-button operating switch arrangements, wherein the steering wheel switch module is configured in such a way that, prefabricated as a whole, it can be installed in and removed from the steering wheel. The drawback here is that a large number of pushbuttons and switches for the operation is provided in a limited installation space, as a result of which no intuitive operation of the individual vehicle functions is possible.

Published application DE 10 2017 106 578 A1 relates to a vehicle indicator having an indicator section, a pointer device and an indicator control section. The indicator control section is set up to indicate an operating screen on the indicator section. The indicator control section is set up to generate an image on the operating screen which contains an object or an object group over a specific range, and is set up to set part of the object or of the object group into an indicator mode that differs from the other part when the operating finger is detected by a detection portion. The drawback here is that an operation is carried out via a touch screen, part of the indicator being hidden by a finger as a result.

Disclosed embodiments provide an operator control device with which intuitive operation of the vehicle functions is possible, an overview in the cockpit of a transportation vehicle being increased and control of the gaze of a driver being guided.

The above is achieved by an operator control device for operating a plurality of vehicle functions in a transportation vehicle, having:

an operator control element for the input of an operating input;

an analysis unit for determining the operating input and a vehicle unit for which the operating input is intended, and for generating a control command for the vehicle unit determined;

an indicator for indicating an input menu;

an interface for transmitting the control command to the vehicle unit for which the operating input is intended, wherein the analysis unit determines a control command which causes the operator control element to be displayed in the input menu, to permit intuitive operation of the vehicle unit with the operator control device.

The above is further achieved by a system for operating a plurality of vehicle functions in a transportation vehicle, having:

a steering wheel having an operator control device as previously defined with a first operating element and/or a second operating element, and an indicator, such as a HUD (head-up display), wherein the operator control element is arranged symmetrically on the left and/or right on a steering wheel spoke of the steering wheel.

In addition, the above is achieved by a method for operating a plurality of vehicle functions in a transportation vehicle, optionally by an operator control device or a system as previously defined, comprising:

determining an operating input and a vehicle unit for which the operating input is intended;

generating a control command for the vehicle unit determined;

indicating an input menu;

transmitting the control command to the vehicle unit for which the operating input is intended, wherein a control command is determined which causes the operating element to be displayed in the input menu, to permit intuitive operation of the vehicle unit with the operator control device.

By using an operator control device and the display of the operator control element in the input menu, a comprehensible and intuitive operation may be carried out for all vehicle functions. Optionally, the operator control device can be used with existing systems and units installed in the transportation vehicle. By using an analysis unit, it can be possible to determine reliably and quickly for which of the systems and units the operating input is intended. An interface permits a cost-efficient operator control element which may be used with existing output devices, systems and units. An interface can be designed to be cable-based and/or wire-free and optionally support one or more communications protocols.

In a disclosed embodiment, provision is made for the indicator to comprise an HUD. As a result, a driver can direct his gaze to the road and, in parallel, carry out an operation by the operator control device. The convenience for the driver and the safety in road traffic are increased.

In a further disclosed embodiment, provision is made for the operator control device to comprise a second operator control element, wherein a first group of vehicle functions can be operated with the first operator control element and a second group of vehicle functions can be operated with the second operator control element. By using grouping, rapid and convenient operation can be carried out. In addition, two identically configured operator control elements can be understood quickly by the driver. The convenience for the driver is further increased.

In a further disclosed embodiment, provision is made for a first group of driving-relevant vehicle functions to be operable with the first operator control element and for a second group of infotainment, media and/or communication functions to be operable with the second operator control element. In this way, grouping according to importance can be carried out, a driver being able to operate all driving-relevant vehicle functions with only one operator control element.

In a further disclosed embodiment, provision is made for the operator control element to be designed as a parallelogram and as a trough, to comprise four pushbuttons, which are each arranged within a depression in the trough, in each case in the corners of the parallelogram, optionally to have an actuator extending vertically at an angle of the parallelogram, which comprises a touch-sensitive slider region, a roller and/or a sliding element, and optionally to have a horizontal dividing element.

A functionality of the operator control element can be expanded by an actuator. In particular, precise setting of a magnitude, such as a temperature of the air conditioning system or a loudness, can be carried out. This actuator can likewise be used to set quantitative values in driver assistance functions or to scroll through displayed lists and for the corresponding selection. A dividing element can create a passive-tactile operator control element which permits improved allocation of and distinction between the pushbuttons. As a result of the arrangement of the pushbuttons, a large distance between the pushbuttons can be created. The risk of maloperation is reduced. Furthermore, an arrangement of the pushbuttons in the corners permits rapid feeling of the pushbuttons.

In a further disclosed embodiment, provision is made for the analysis unit to determine a control command which causes a display of the operator control element with a graphic of the functions to be operated which, in its arrangement and formal shape, corresponds to the shape and arrangement of an operating region of the operator control element. In this way, an unambiguous semantic allocation can be made. Furthermore, a driver can be guided through the input menu safely, quickly and in a manner not prone to faults. Convenient and easily comprehensible operation of the vehicle functions can be carried out. An operating region can comprise all the pushbuttons, switches and sensors of the operator control element that can be used for the input.

In a further disclosed embodiment, provision is made for the analysis unit to determine a position of a finger touching the operator control element and for the control command to cause the determined position to be displayed in an indicator region of the indicator, wherein the control command may effect a graphically highlighted representation of the operator control element touched by the finger and may effect a graphically highlighted display of a function to be operated if the determined position of the finger and the graphic of the function to be operated are located one above another. It goes without saying that the operator control element at least partly has a touch-sensitive surface. A highlighted display of the operator control element touched by the finger can be carried out, for example, by changing the size, brightness, contrast, color, animation or the like of the operator control element displayed. A highlighted display of a function to be operated can be carried out in a manner analogous to the highlighted display of the operator control element touched by the finger, wherein the driver may be informed by the display of the function, particularly by text or a pictogram.

In a further disclosed embodiment, provision is made for the analysis unit to be designed to determine a pressure on a pushbutton and/or the actuator and to generate a control command which effects an input confirmation when the pressure is greater than or equal to a predefined threshold value, wherein the operator control element may be designed to output haptic, acoustic and/or visual feedback. Visual feedback can comprise illumination of the pushbuttons and/or of the actuator. It is also conceivable to provide feedback by vibration, as is known in smartphones. As a result of threshold-based pressure comparison, maloperation can be counteracted technically simply. A display of the determined position in an indicator region of an indicator increases the operating convenience. In addition, intuitive and rapid operation of the vehicle functions can be carried out.

A slider region is a touch-sensitive region which can be operated similar to a mouse wheel. Optionally, scrolling and/or setting of a parameter is possible with the slider region, to permit a display and/or operation of comprehensive contents in a limited space.

Touch-sensitive methods or mechanisms, in particular, in connection with an input device, that a control command can be generated and transmitted merely by touching the input device, so that a technical device can be controlled or an allocation operator can be guided by touch. The technical implementation of the command input is as it were invisible to the user and thus generates the impression of direct control by touch, such as tapping and/or swiping or the like.

The head-up display (HUD) is an indicator system in which the user can maintain his viewing direction and, therefore, his head posture, since the information is projected into his field of vision. In addition to pilots, the users also include transportation drivers.

The various exemplary embodiments recited in this application can be combined with one another if not otherwise expressed in the individual case.

FIG. 1 shows a schematic illustration of an operator control device 10 for operating a plurality of vehicle functions in a transportation vehicle. The operator control device 10 comprises an operator control element 12 having four pushbuttons 14, an analysis unit 16, an interface 18 and an indicator 20.

The operator control element 12 may be arranged in a structure, in particular, in a trough. Four pushbuttons 14 for operating vehicle functions are arranged on the operator control element 12. In addition, an actuator, not shown, can be provided vertically between the pushbuttons 14.

Optionally, a surface of the operator control element 12 is touch-sensitive, the operator control device 10 being able to determine the position of a finger on the surface. The position of the finger can be made visible, for example, in an indicator region of the indicator 20, in particular, a display and/or HUD, specifically as soon as the finger touches the surface, i.e., before the actual operating process. The operating process can be executed with a pressure, similar to a pushbutton pressure in mechanical pushbuttons. The operator control element 12 may be equipped with force sensors. Both the actuation of the touch points and also the sliding and touching are therefore possible with a defined force, to counteract inadvertent operation.

In addition, haptic feedback can be provided for the operator control element 12, to permit noticeable feedback of the operating process and to safely permit a driver to execute the operating actions unambiguously. It goes without saying that visual feedback, such as an illumination of the operator control element 12 and the pushbuttons 14, can also be provided.

The analysis unit 16 is designed to determine the operating input and to assign it to a vehicle unit for which the operating input is intended. The analysis unit 16 can then generate a control command for the vehicle unit determined. The control command implements the control of the vehicle unit that is performed by the operating input.

The indicator 20 is designed to display an input menu with an illustration of the operator control element 12. Optionally, the input menu illustrated comprises a display of the operator control element 12 with a graphic relating to the functions to be operated or a functional assignment of the operator control element 12. Particularly, a highlighted display of the operator control element 12 or of the function can be carried out when the latter has been selected.

The interface 18 is designed to transmit the control command to a vehicle unit, not illustrated. For the transmission, the interface 18 may be connected to a transmission network internal to the transportation vehicle. In addition, the interface 18 can also be designed for wire-free communication or connected to a proprietary, for example, cable-based, transmission network.

Figure 2:
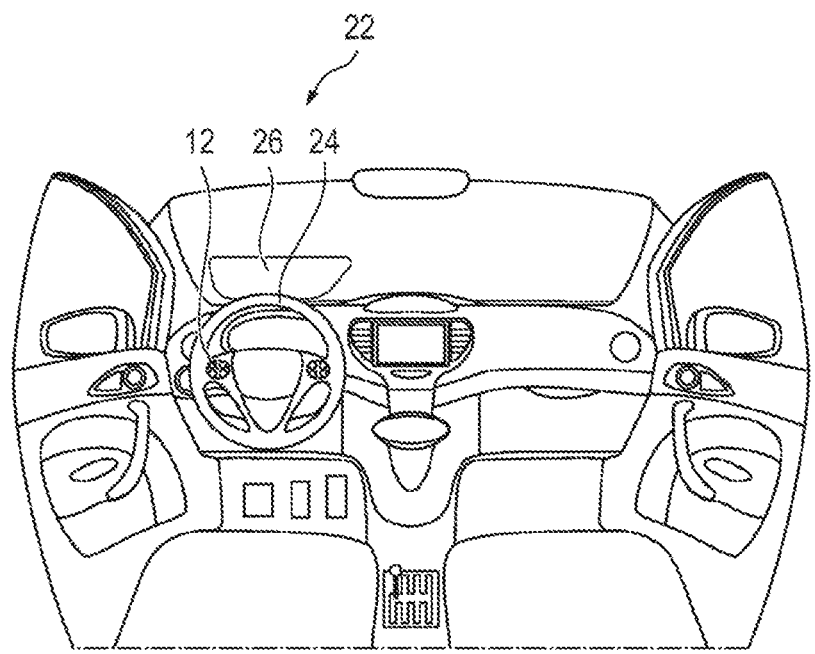
FIG. 2 shows a schematic illustration of a cockpit of a transportation vehicle.

FIG. 2 shows a schematic illustration of a system 22 in a cockpit of a transportation vehicle. The system 22 comprises a steering wheel 24 with an operator control device. The system 22 further comprises an indicator 20, such as a HUD. The steering wheel 24 has a respective operator control element 12 both on the right-hand side and on the left-hand side. The operator control elements 12 are each located at a height at which the thumbs of a driver of the transportation vehicle may also be located when driving the transportation vehicle, so that the operator control elements 12 and the pushbuttons 14 can be operated conveniently during the journey.

An indicator region 26 of the indicator 20, such as a HUD, is illustrated in the field of view of the driver.

Figure 3:
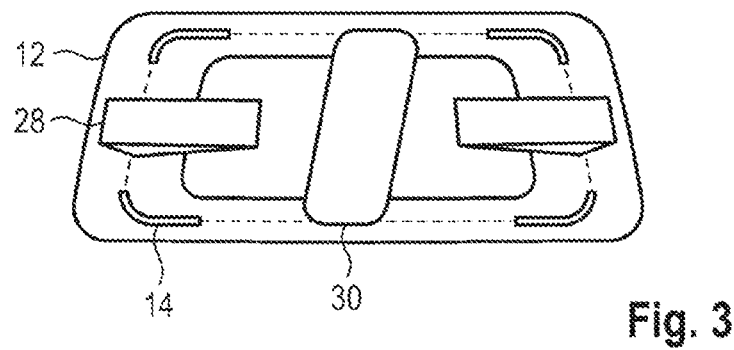
FIG. 3 shows a schematic detailed illustration of an exemplary embodiment of an operator control element.

FIG. 3 shows a schematic detailed illustration of a disclosed embodiment of an operator control element 12. The operator control element 12 has an operating region which, overall, is shaped as a parallelogram-like trough. In this way, the operating region can be detected unambiguously haptically by a driver. Within this trough, in each case in the corners, are four pushbuttons 14 that are operating points/touch points, which can likewise be touched unambiguously by a deepened shape of the trough at these locations. Consequently, an unambiguous physical allocation, in particular, feeling, can be carried out without any visual monitoring.

The operator control element 12 also has a horizontal dividing element 28, which separates the four touch points tactilely from one another. The touch points in the example shown are identified by a contrasting graphic, which may be illuminated after dark, to create visual feedback for the driver.

In the center of the operating region there is a trough running vertically at the angle of the parallelogram, which has approximately the width of the finger and is designed as an actuator 30, such as a touch-sensitive slider region. It goes without saying that different actuators 30, such as a roller, a rotary knob or the like, are conceivable. This slider region is used to set various parameters such as loudness, quantitative values in driver assistance functions and/or to scroll through displayed lists and for the corresponding selection. The actuator 30 in the example shown divides the horizontal dividing element 28 into a first portion and a second portion. As a result of the interaction of the actuator 30 and the horizontal dividing element 28, the four pushbuttons 14 are separated structurally from one another and can each be touched individually directly and simply.

A surface of the operator control element 12 is touch-sensitive, so that the analysis unit 16 determines the position of a finger and may determine a control command which causes the finger position to be indicated correspondingly in the indication region of an indicator 20. Particularly, the finger position is already indicated when the finger touches the surface, i.e., before the actual operating process.

The operating process can be implemented with a pressure, for example, similar to a button press, as in mechanical pushbuttons. It goes without saying that the operator control element 12 may be equipped with force sensors for this purpose. Both the actuation of the touch points and the sliding can consequently be carried out starting at a defined force, so that inadvertent operation can be ruled out.

In addition, haptic feedback can be provided for the operator control element 12, to permit noticeable feedback of the operating process and thus to be able to execute operating actions safely and unambiguously. It goes without saying that acoustic feedback, such as a confirmation sound or the like, is also conceivable.

The operator control element 12 is designed as a capacitive touch and slider element and is used as an input element for various functions, which can be indicated and operated in combination with an indicator 20, such as a display, head-up display etc. The operator control element 12 and consequently also a cockpit having such an operator control element 12 is very clear and reduced.

Figure 4A:
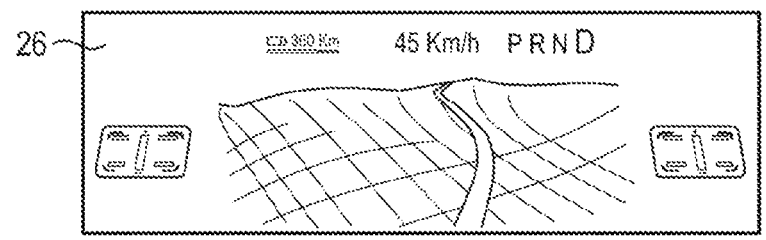
FIGS. 4a and 4b show a schematic illustration of an operating process with an operator control device.
Figure 4A:
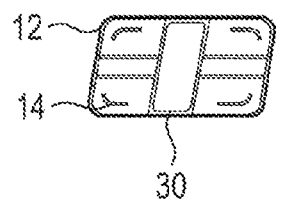
Figure 4B:
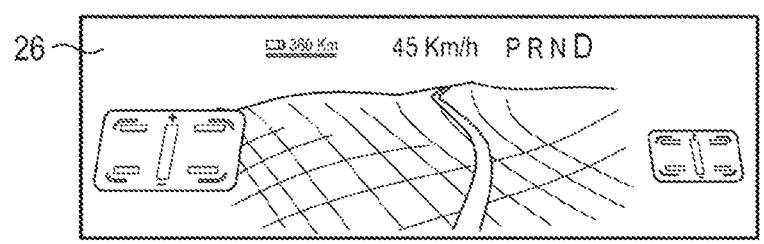
Figure 4B:
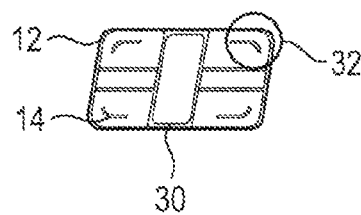

FIGS. 4a and 4b show a schematic illustration of an operating process with an operator control device 10. Illustrated in an upper region of FIGS. 4a and 4b is an indicating area 26 of an indicator 20, not shown, and two operator control elements 12 are illustrated schematically in a lower region. An operating input is illustrated by a border 32 around an operating region of the operator control element 12.

In FIG. 4a, the respective context to be operated or the function to be operated is depicted in the indicating area 26, optionally in the driver's line of sight. Averting the gaze of the driver is minimized. The operator control elements 12 in the example shown are designed symmetrically on the left and right. Optionally, a first grouping and content-based allocation of contexts/functions can be carried out. For example, all the driving-relevant functions can be located on the left, such as driver assistance functions, vehicle functions etc., and infotainment, media, communication functions on the right. The graphic of the functions or functional assignment that is indicated in the indicating area 26 corresponds in arrangement and formal configuration to the configuration and arrangement of the operator control elements 12, so that an unambiguous semantic allocation can be made.

An operating input is shown in FIG. 4b. To permit an unambiguous and reliable operation, the surfaces of the operator control elements 12 are configured in such a way that the finger which operates is detected appropriately by sensors, and the position of the "operating finger" is visualized in the indicating area 26. Therefore, a clear position determination may be possible at any time. If a finger is detected on an operating region for the operation, the corresponding indicating area—on the left or right—is highlighted graphically: for example, by using a variation in the size, brightness, contrast and/or color. If a function to be operated is touched with the finger, this is likewise highlighted graphically and as a result feedback is given that this function has been selected and is to be operated. The operation and/or activation can then be carried out with a pressure on the operator control element 12.

In FIGS. 5a to 5d, in a manner analogous to FIGS. 4a and 4b, a schematic illustration of an operating process, such as a phone call, is shown.

Figure 5A:
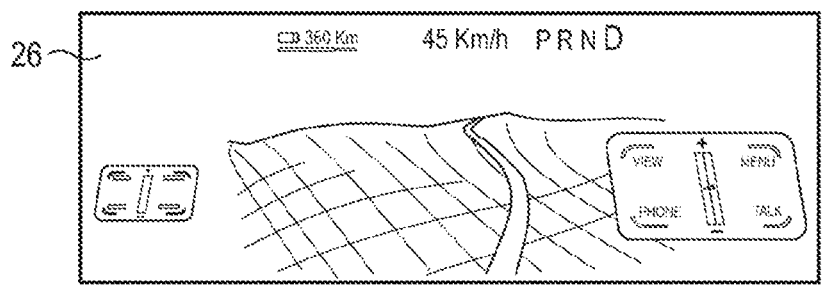
FIGS. 5a to 5d show a schematic illustration of a further operating process with an operator control device.
Figure 5A:
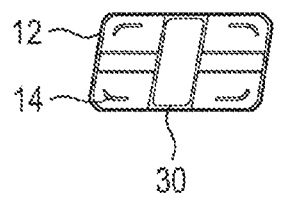

In FIG. 5a, a touch on the right-hand operator control element 12 is illustrated, an illustration of the operator control element 12 in the indicating area 26 in enlarged form is carried out, and the functions occupied by the pushbuttons 14 are illustrated.

Figure 5B:
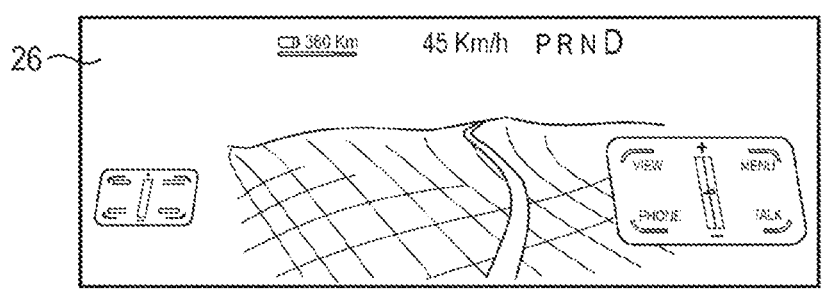
Figure 5B:
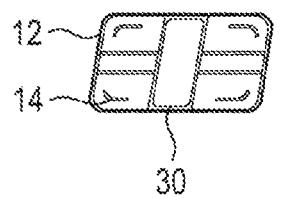

In FIG. 5b, pressing on the left-hand lower pushbutton 14 of the right-hand operator control element 12 is illustrated, as a result of which an input menu, such as a telephone menu, is selected and the functions of the telephone menu assigned to the pushbuttons 14 are illustrated.

Figure 5C:
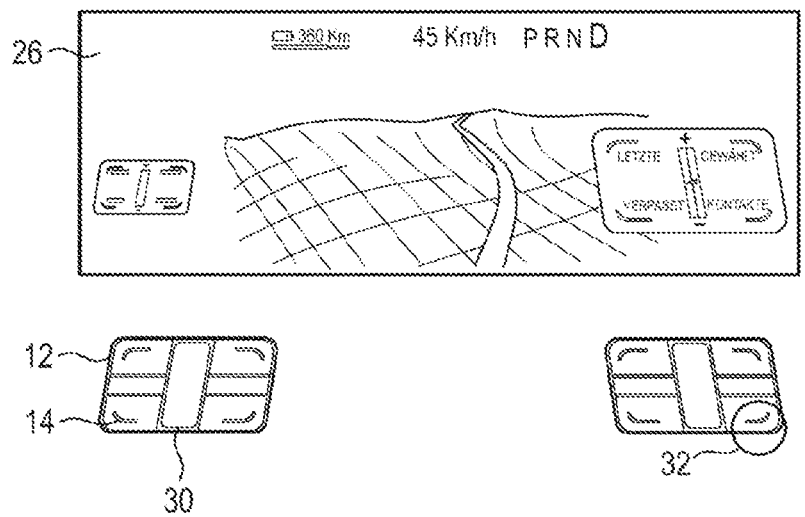

In FIG. 5c, pressing on the right-hand lower pushbutton 14 of the right-hand operator control element is illustrated, as a result of which, analogously to FIG. 5b, a sub-menu for telephone contacts is selected.

Figure 5D:
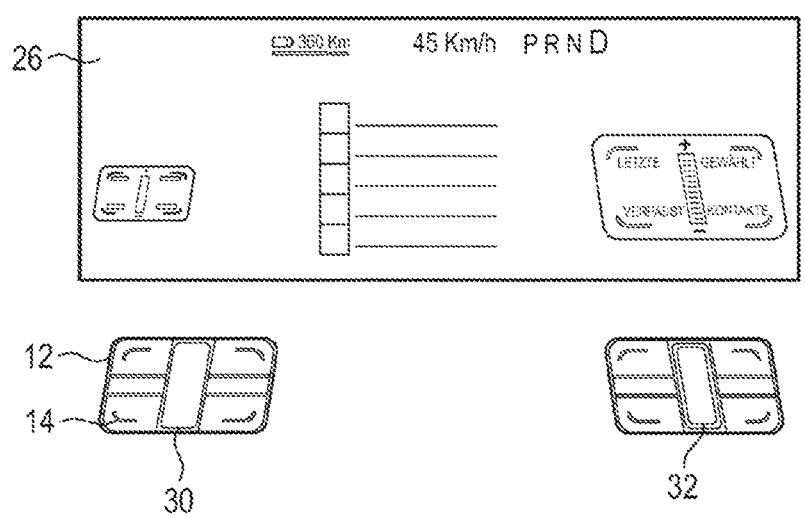

In FIG. 5d, pressing and guiding the operating finger over the actuator 30 of the right-hand operator control element 12 is illustrated; as a result a list of the telephone contacts can be leafed through or scrolled through. For example, if a contact is marked, a call to this contact can then be started by actuating a pushbutton 14.

In FIGS. 6a to 6d, in a manner analogous to FIGS. 5a to 5d, a schematic illustration of an operating process, such as setting a recommended speed for an automatic cruise controller, is shown.

Figure 6A:
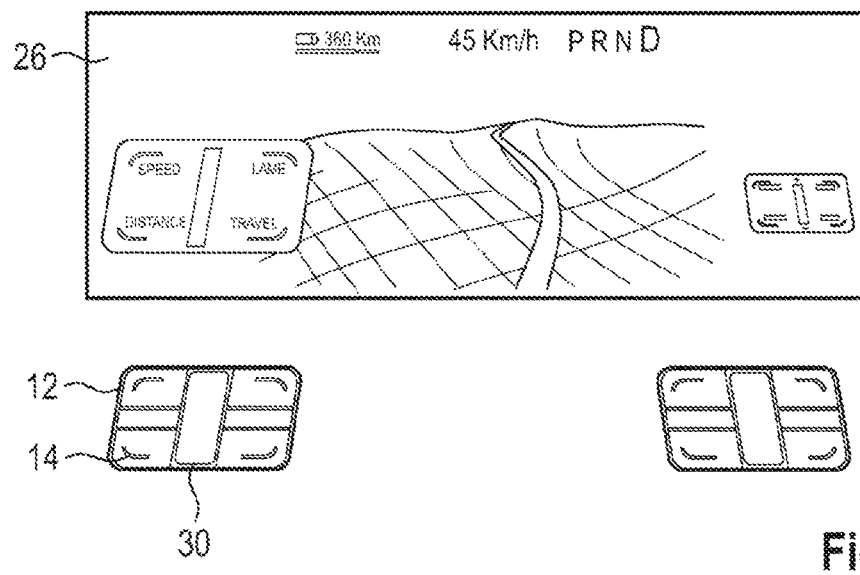
FIGS. 6a to 6d show a schematic illustration of a further operating process with an operator control device.

In FIG. 6a, touching the left-hand operator control element 12 is illustrated, an illustration of the operator control element 12 in the indicating area 26 is carried out in enlarged form, and the functions associated with the pushbuttons 14 are illustrated.

Figure 6B:
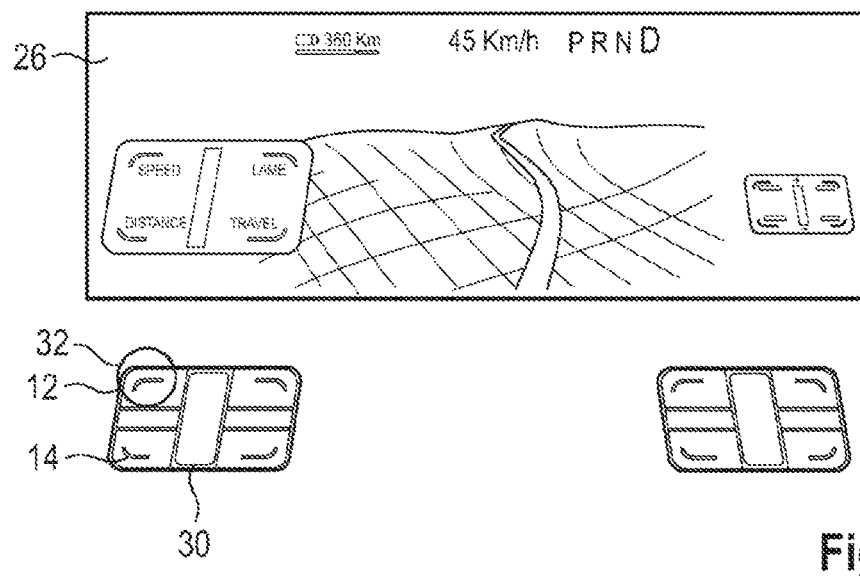

In FIG. 6b, pressing the left-hand upper pushbutton 14 of the left-hand operator control element 12 is illustrated, as a result of which an input menu for setting a recommended speed for the automatic cruise controller is opened.

Figure 6C:
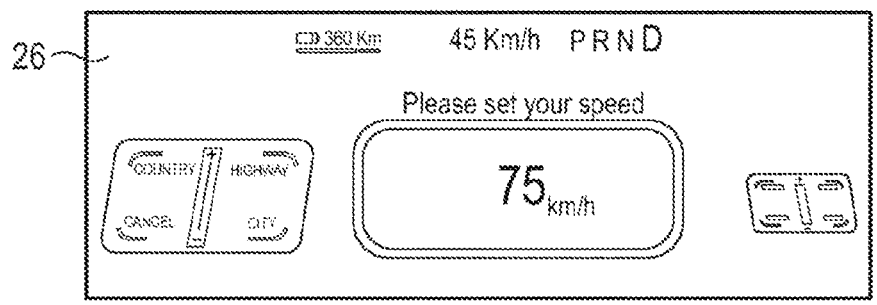
Figure 6C:
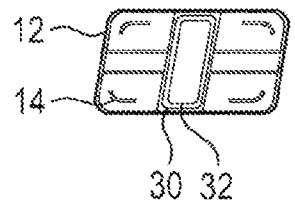
Figure 6C:
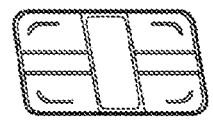

In FIG. 6c, pressing and guiding the operating finger over the actuator 30 of the left-hand operator control element 12 is illustrated, as a result of which a recommended speed can be set conveniently. In the example shown, a recommended speed of 75 km/h is selected.

Figure 6D:
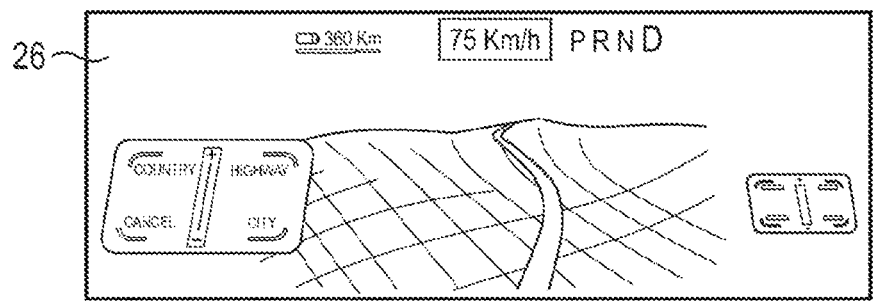
Figure 6D:
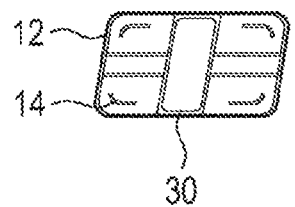
Figure 6D:

In FIG. 6d, the indicating area 26 with the set new recommended speed of 75 km/h is illustrated.

Figure 7:
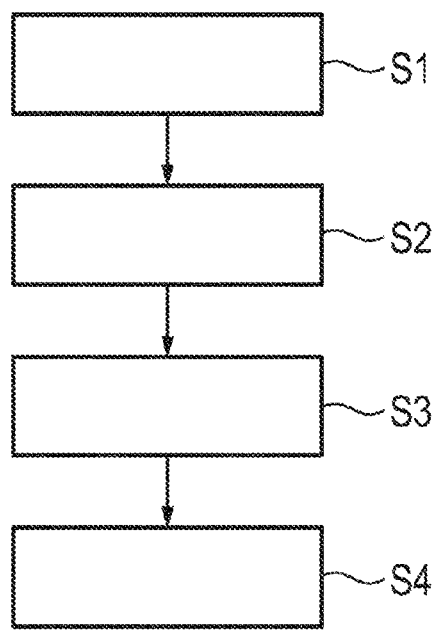
FIG. 7 shows a schematic illustration of the disclosed method.

In FIG. 7, the disclosed method for operating a plurality of vehicle functions in a transportation vehicle, optionally by an operator control device 10 or a system 22 as previously defined, are shown schematically.

In a first operation at S1, a determination of an operator input is carried out. By actuation of the pushbutton 14, an actuation of the slider region and/or a determined finger position, it is determined which function a driver wishes to control and with which parameters. In addition, a vehicle unit for which the operating input is intended is determined. For example, the vehicle unit can be an air-conditioning system of the transportation vehicle if the driver sets a temperature by using the operator control device 10.

In a second operation at S2, a generation of a control command for the vehicle unit determined is carried out.

In a third operation at S3, an input menu is output.

In a fourth operation at S4, the control command is transmitted to the vehicle unit for which the operating input is intended.

The control command causes the operator control element 12 to be displayed in the input menu, to permit intuitive operation of the vehicle unit with the operator control device 10.

The disclosure has been described extensively. A person skilled in the art will recognize that the disclosed embodiments can be applied to any type of transportation vehicles, in particular, including watercraft, aircraft, rail vehicles. A passenger car was selected merely by way of example as a transportation vehicle to illustrate the disclosed embodiments. In particular, at least one of the following benefits can be achieved with the teaching disclosed:
  reduced, uncluttered impression of the steering wheel operation,
  situation-based, context-based interaction-contacts/functions can be configured flexibly,
  safe, intuitive operation in the driver's line of sight-blind operation possible,
  personalizable allocation/configuration is possible,
  a flexible system that can be expanded in the event of additional functions can be created.

LIST OF DESIGNATIONS

10 Operator control device
12 Operating element
14 Pushbutton
16 Analysis unit
18 Interface
20 Indicator
22 System
24 Steering wheel 26 Indicating area
28 Dividing element
30 Actuator
32 Border
S1 First method operation-determination of an operating input
S2 Second method operation-generation of a control command
S3 Third method operation-output of an input menu
S4 Fourth method operation-transmission of a control command

The invention claimed is:

1. An operator control device for operating a plurality of vehicle functions in a transportation vehicle, the operator control device comprising:
   an operator control element configured to receive input of an operating input from a user;
   an analysis unit configured to determine the received operating input and a vehicle unit within the transportation vehicle for which the received operating input is intended to control, wherein the analysis unit is further configured to generate a control command to control the determined vehicle unit based on the received operating input;
   an indicator separated from the operator control element and configured to output an input menu to the user; and
   an interface configured to transmit the generated control command to the vehicle unit of the transportation vehicle for which the operating input is intended,
   wherein the analysis unit is further configured to determine a control command causing a representation of the operator control element for which the operating input is intended to be displayed in the input menu to enable intuitive operation of the vehicle unit using the operator control device, and
   wherein the analysis unit is further configured to determine a pressure on a pushbutton and/or the actuator and generate a further control command which confirms the receipt input on the displayed operator control element in response to the pressure being greater than or equal to a predefined threshold value, whereby the further control command causes the operator control element to output haptic, acoustic and/or visual feedback from the operator control element highlighting the location of the operator control element to the user as confirmation of the input selection.

2. The operator control device of claim 1, wherein the indicator comprises an HUD (Head-Up Display).

3. The operator control device of claim 1, wherein the operator control device comprises a second operator control element, wherein a first group of vehicle functions is operated with the first operator control element, and a second group of vehicle functions is operated with the second operator control element.

4. The operator control device of claim 1, wherein a first group of driving-relevant vehicle functions is operated with the first operator control element and a second group of infotainment, media and/or communication functions is operated with a second operator control element.

5. The operator control device of claim 1, wherein the operator control element:
   is a parallelogram forming a trough;
   comprises four pushbuttons arranged within a depression in the trough in the corners of the parallelogram;
   has an actuator extending vertically at an angle of the parallelogram, which comprises a touch-sensitive slider region, a roller and/or a sliding element; and
   has a horizontal dividing element.

6. The operator control device of claim 1, wherein the analysis unit is further configured to determine a control command causing the operator control element to be illustrated with a graphic of the functions to be operated which corresponds to the shape and arrangement of an operating region of the operator control element.

7. The operator control device of claim 1, wherein the analysis unit is further configured to determine a position of a finger touching the operator control element, and the control command causes the determined position to be displayed in an indicating region of the indicator, wherein the control command effects a graphically highlighted representation of the operator control element touched with the finger and causes a graphically highlighted representation of a function to be operated in response to the determined position of the finger and the graphic of the functions to be operated being located above one another.

8. A system for operating a plurality of vehicle functions in a transportation vehicle having a steering wheel, the operator control device of claim 1 with a first operator control element and/or a second operator control element, and an indicator that is an HUD, wherein the operator control element is arranged symmetrically on the left and/or right on a steering wheel spoke of the steering wheel.

9. A method for operating a plurality of vehicle functions in a transportation vehicle, the method comprising:
   determining an operating input and a vehicle unit for which the operating input is intended;
   generating a control command for the determined vehicle unit;
   indicating an input menu; and
   transmitting the control command to the vehicle unit for which the operating input is intended,
   wherein a control command is determined which causes an operator control element to be displayed in the input menu to permit intuitive operation of the vehicle unit with an operator control device that includes the operator control element, and
   wherein, in response to a determined pressure on a pushbutton and/or an actuator, a further control command is generated which confirms receipt of the input on the displayed operating element in response to the pressure being greater than or equal to a predefined threshold value, whereby a haptic, acoustic and/or visual feedback is output from the operator control element highlighting the location of the operator control element to the user as confirmation of the received user input.

10. The method claim 9, wherein the indicator comprises an HUD (Head-Up Display).

11. The method of claim 9, wherein the operator control is a first operator control element and the operator control device comprises a second operator control element, wherein a first group of vehicle functions is operated with the first operator control element and a second group of vehicle functions is operated with the second operator control element.

12. The method of claim 11, wherein a first group of driving-relevant vehicle functions is operated with the first operator control element, and a second group of infotainment, media and/or communication functions is operated with the second operator control element.

13. The method of claim 9, wherein the operator control element is a parallelogram forming a trough, comprises four pushbuttons arranged within a depression in the trough in the corners of the parallelogram, has an actuator extending vertically at an angle of the parallelogram, which comprises a touch-sensitive slider region, a roller and/or a sliding element, and has a horizontal dividing element.

14. The method of claim 9, further comprising determining a control command causing the operator control element to be illustrated with a graphic of the functions to be operated which corresponds to the shape and arrangement of an operating region of the operator control element.

15. The method of claim 9, further comprising determining a position of a finger touching the operator control element, and the control command causes the determined position to be displayed in an indicating region of the indicator, wherein the control command effects a graphically highlighted representation of the operator control element touched with the finger and causes a graphically highlighted representation of a function to be operated in response to the determined position of the finger and the graphic of the functions to be operated being located above one another.

* * * * *